US006978346B2

(12) United States Patent
Baek et al.

(10) Patent No.: US 6,978,346 B2
(45) Date of Patent: Dec. 20, 2005

(54) APPARATUS FOR REDUNDANT INTERCONNECTION BETWEEN MULTIPLE HOSTS AND RAID

(75) Inventors: Sung-Hoon Baek, Taejon (KR); Joong-Bae Kim, Taejon (KR); Yong-Youn Kim, Taejon (KR)

(73) Assignee: Electronics and Telecommunications Reseach Institute, (KR)

( * ) Notice: Subject to any disclaimer, the term of this patent is extended or adjusted under 35 U.S.C. 154(b) by 856 days.

(21) Appl. No.: 09/753,245

(22) Filed: Dec. 29, 2000

(65) Prior Publication Data

US 2002/0035669 A1    Mar. 21, 2002

(30) Foreign Application Priority Data

Sep. 19, 2000  (KR) ............................... 2000-54807

(51) Int. Cl.[7] ........................ G06F 13/00; G06F 12/00
(52) U.S. Cl. ..................................... 711/114; 709/250
(58) Field of Search ............................... 709/201–203, 709/217–219, 223–224, 239–240, 244, 250; 711/114; 710/38; 370/360, 412

(56) References Cited

U.S. PATENT DOCUMENTS

| 4,652,536 | A | | 3/1987 | Nakajima et al. | |
|---|---|---|---|---|---|
| 5,251,062 | A | | 10/1993 | Snitzer et al. | |
| 5,798,306 | A | | 8/1998 | Dickinson, Jr. | |
| 5,812,754 | A | * | 9/1998 | Lui et al. ....................... | 714/6 |
| 6,192,485 | B1 | * | 2/2001 | Takita et al. ................... | 714/6 |
| 6,609,213 | B1 | * | 8/2003 | Nguyen et al. ................. | 714/4 |
| 6,820,171 | B1 | * | 11/2004 | Weber et al. ................... | 711/114 |

OTHER PUBLICATIONS

Tellurite glass: a new candidate for fiber devices by J.S. Wang: Optical Materials 3 (1994) 187-203.
Structure and optical properties of rare earth doped zinc oxyhalide tellurite glasses by D.L. Sidebottom: Journl of Non-Crystalline Solids 222 (1997), pp. 282-289.
Raman spectra snd thermal analysis of a new lead-tellurium-germanate glass system by Z. Pan: Journl of Non-Crystalline Solids 210 (1997), pp. 130-135.

* cited by examiner

*Primary Examiner*—Krisna Lim
(74) *Attorney, Agent, or Firm*—Blakely Sokoloff Taylor & Zafman

(57) ABSTRACT

The apparatus for a redundant interconnection between multiple hosts and a redundant array of inexpensive disks (hereinafter, referred to as 'RAID'), which is capable of supporting a fault tolerance of RAID controllers and simultaneously heightening a performance, comprises a plurality of RAID controlling units for processing a requirement of numerous host computers connected with one another through the industrial standard communication network and for fault tolerance; a plurality of connecting units for connecting the plurality of RAID controlling units to the numerous host computers; and a plural number of network interface controlling units respectively contained into the plurality of RAID controlling units, for exchanging information directly with an opposite network interface controlling unit provided within an opposite RAID controlling unit and the numerous host computers, through the plurality of connecting units.

9 Claims, 6 Drawing Sheets

US 6,978,346 B2

APPARATUS FOR REDUNDANT INTERCONNECTION BETWEEN MULTIPLE HOSTS AND RAID

FIELD OF THE INVENTION

The present invention relates to an apparatus for a redundant interconnection between multiple host computers and a redundant arrays of inexpensive disks (hereinafter, referred to as 'RAID'); and, more particularly, to an apparatus for a redundant interconnection between multiple host computers and multiple controllers of the RAID, which is capable of supporting a fault tolerance of the RAID controllers and simultaneously heightening performance.

PRIOR ART OF THE INVENTION

A RAID is a storage system based on a large capacity and a high performance, by using much quantity of disks, and is a fault tolerant system in which the disks or controllers etc. have a redundant nature. In general, the RAID has two controllers, which are used like a method shown in FIG. 1 or 2.

FIG. 1 is an exemplary block diagram showing a general connection method between the host computers and the RAID having the conventional two controllers.

As shown in the drawing, the RAID 130 includes two RAID controllers 140, 141 and each of RAID controllers 140, 141 includes network interface controllers 150, 151. The network interface controllers 150, 151 of the RAID controllers 140, 141 are independently connected to network interface controllers 110, 111 of the host computers 100, 101 through communication links 120, 121 such as a copper line and an optical fiber. That is, such system has twice the bandwidth and twice the performance. However, there is such a problem that a loss of data occurs when one out of two RAID controllers 140, 141 has a trouble, in other words, this system does not become the fault tolerant system.

FIG. 2 is an exemplary block diagram of a general host interface system having a communication interface for an error recovery between the conventional two controllers.

In order to provide fault tolerance not provided in FIG. 1, RAID 240 includes two RAID controllers 230, 231 and two RAID controllers 230, 231 and host computers 200, 201 are connected with each other through a hub or switch 210 in one network. The RAID controller 230 includes a pair of network interface controllers 220 and 221 and the RAID controller 231 includes a pair of network interface controllers 222 and 223. Thus, even though one RAID controller 230 or 231 has a trouble, all of the host computers 200, 201 are connected to a RAID controller that does not have a trouble. That is, this RAID controller not having the trouble serves as a role of the controller that has the trouble. Also, since the RAID controllers 230, 231 should exchange information with each other by preparing in advance against some trouble, the RAID controllers 230, 231 are connected with each other through communication controllers 221, 222. However, in this case only a half of performance for the bandwidth provided in FIG. 1 can be obtained.

FIG. 3 is an exemplary block diagram showing a wiring method between a conventional RAID and the host computers.

The construction shown in the drawing partially represents a systematic connection between a RAID and host computers, which is extracted from contents disclosed in the U.S. Pat. No. 5,812,754. The RAID 340 includes two RAID controllers each of which has network interference controllers 330, 331 and four ports 310, 311, 320 and 321. However, this construction has no any difference from that of FIG. 2, in the structure of a communication network, and in case that one out of two host computers 300, 301 has rather a trouble, there is caused a problem that a network is broken. Thus, this construction is inferior to the construction of FIG. 2.

SUMMARY OF THE INVENTION

Therefore, it is an object of the present invention to provide an apparatus for a redundant interconnection between multiple host computers and a RAID, which is capable of supporting a fault tolerance of a RAID controller and simultaneously heightening a performance.

In accordance with the present invention, the apparatus for a redundant interconnection between multiple hosts and a RAID comprises a plurality of RAID controllers for processing requests of numerous host computers connected with one another through an industrial standard communication network such as fibre channel and performing fault tolerant function; a plurality of connecting units for connecting the plurality of RAID controllers to the numerous host computers; and a plural number of network interface controllers respectively contained into the plurality of RAID controllers, the network interface controllers being for exchanging information directly with each of opposite network interface controllers provided within the numerous host computers and within opposite RAID controllers, through the plurality of connecting units.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
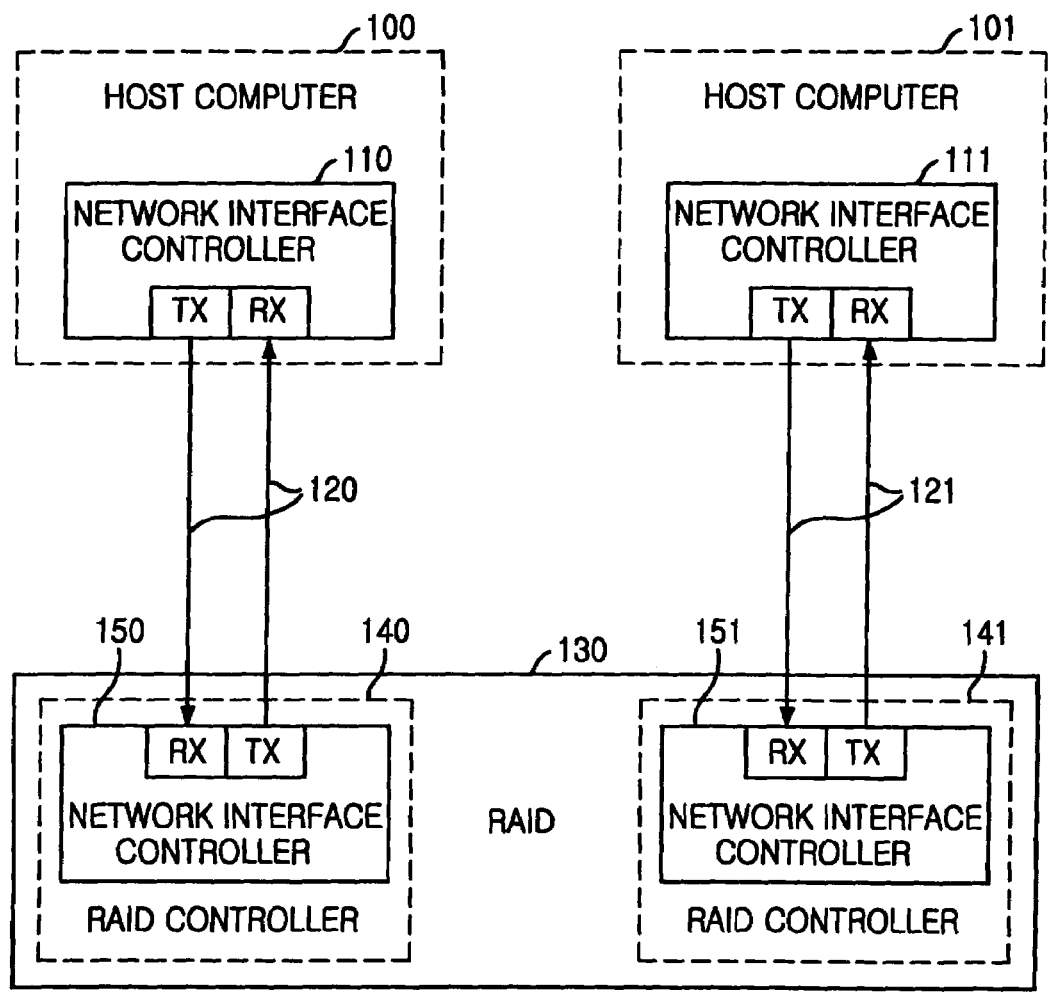
FIG. 1 is an exemplary block diagram showing a general connection system between host computers and a RAID having conventional two controllers.
Figure 2:
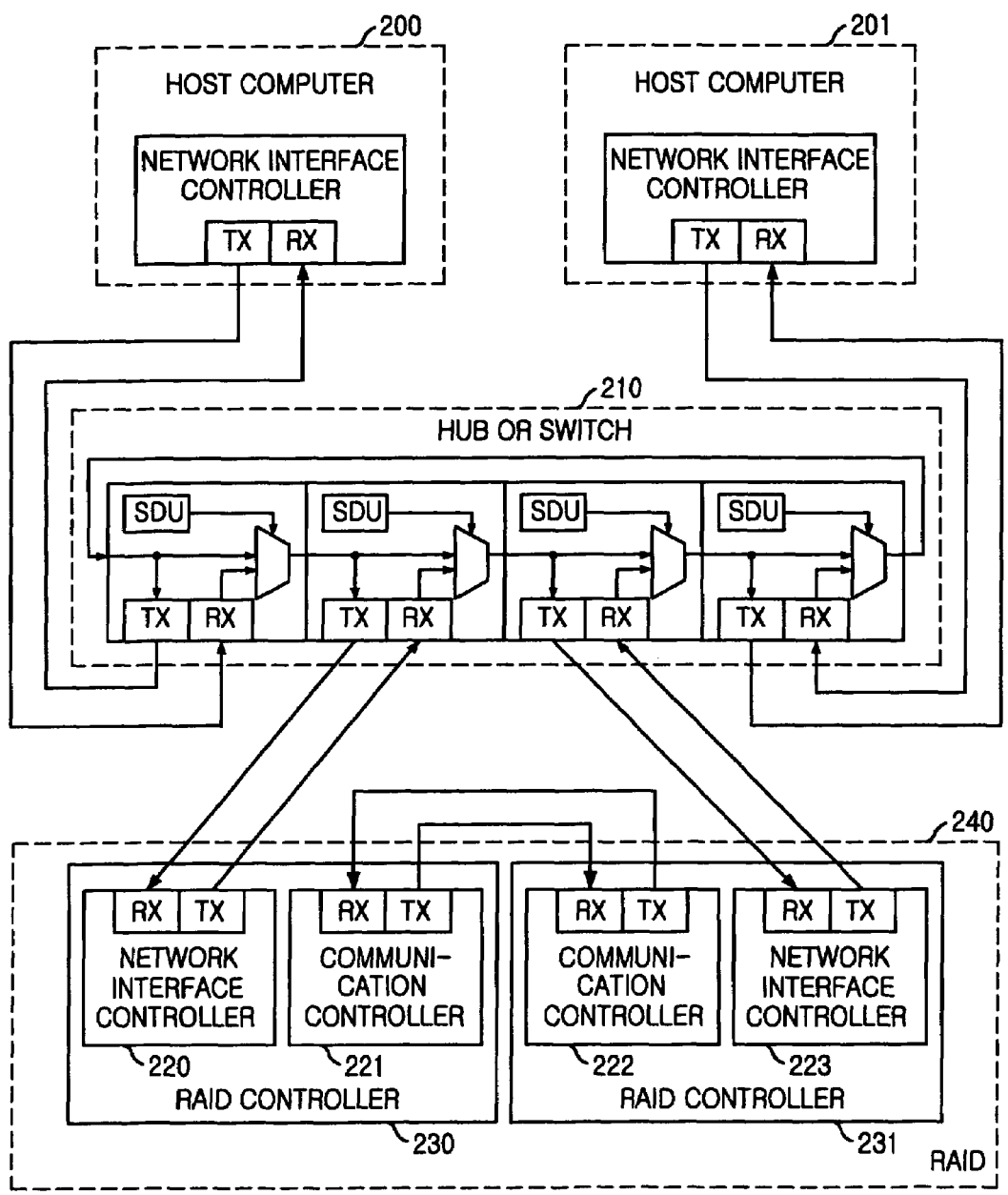
FIG. 2 indicates an exemplary block diagram of a general host interface system having a communication interface for an error recovery between the conventional two controllers.
Figure 3:
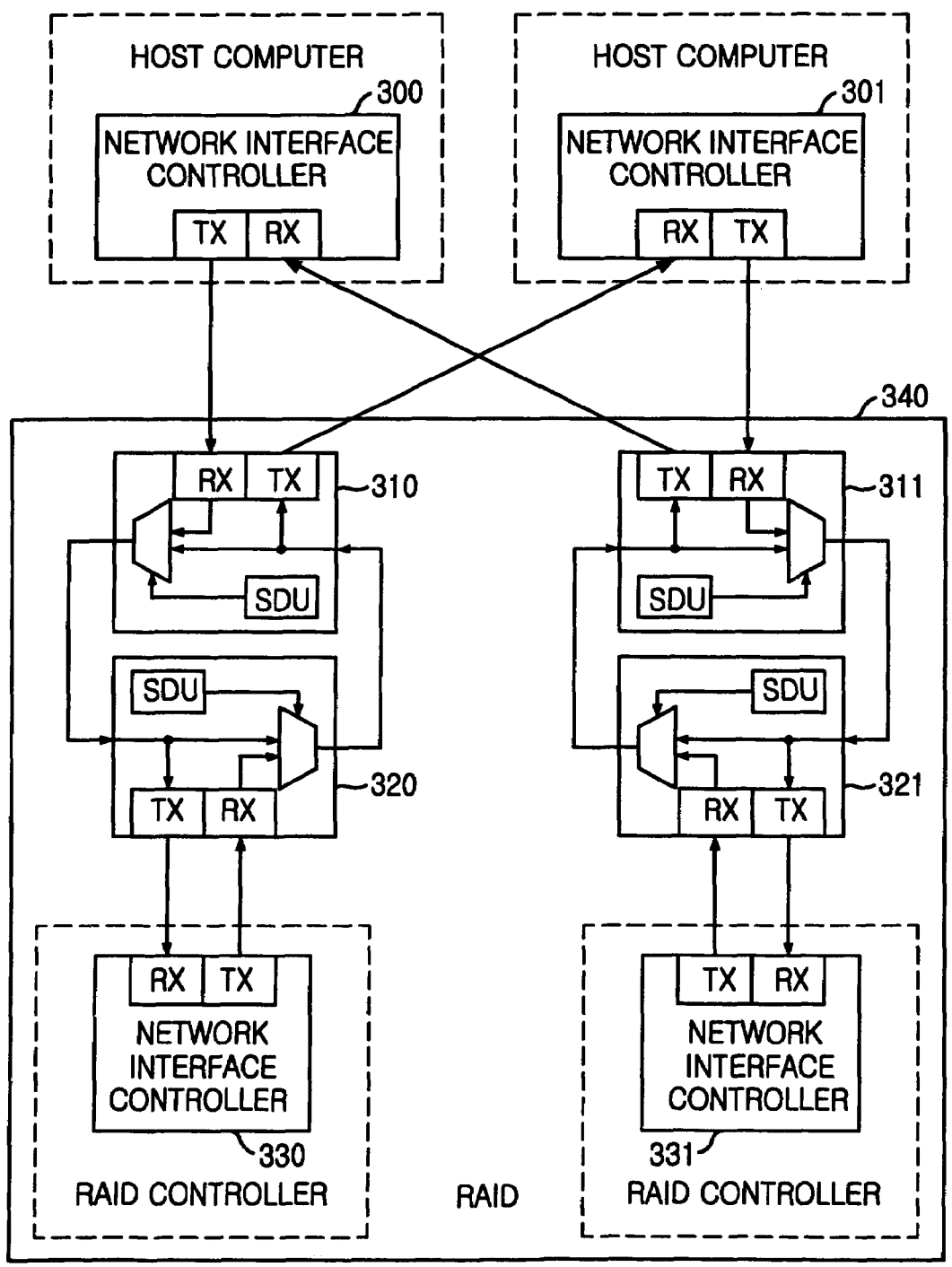
FIG. 3 illustrates an exemplary block diagram of a wiring method between a conventional RAID and host computers.
Figure 4:
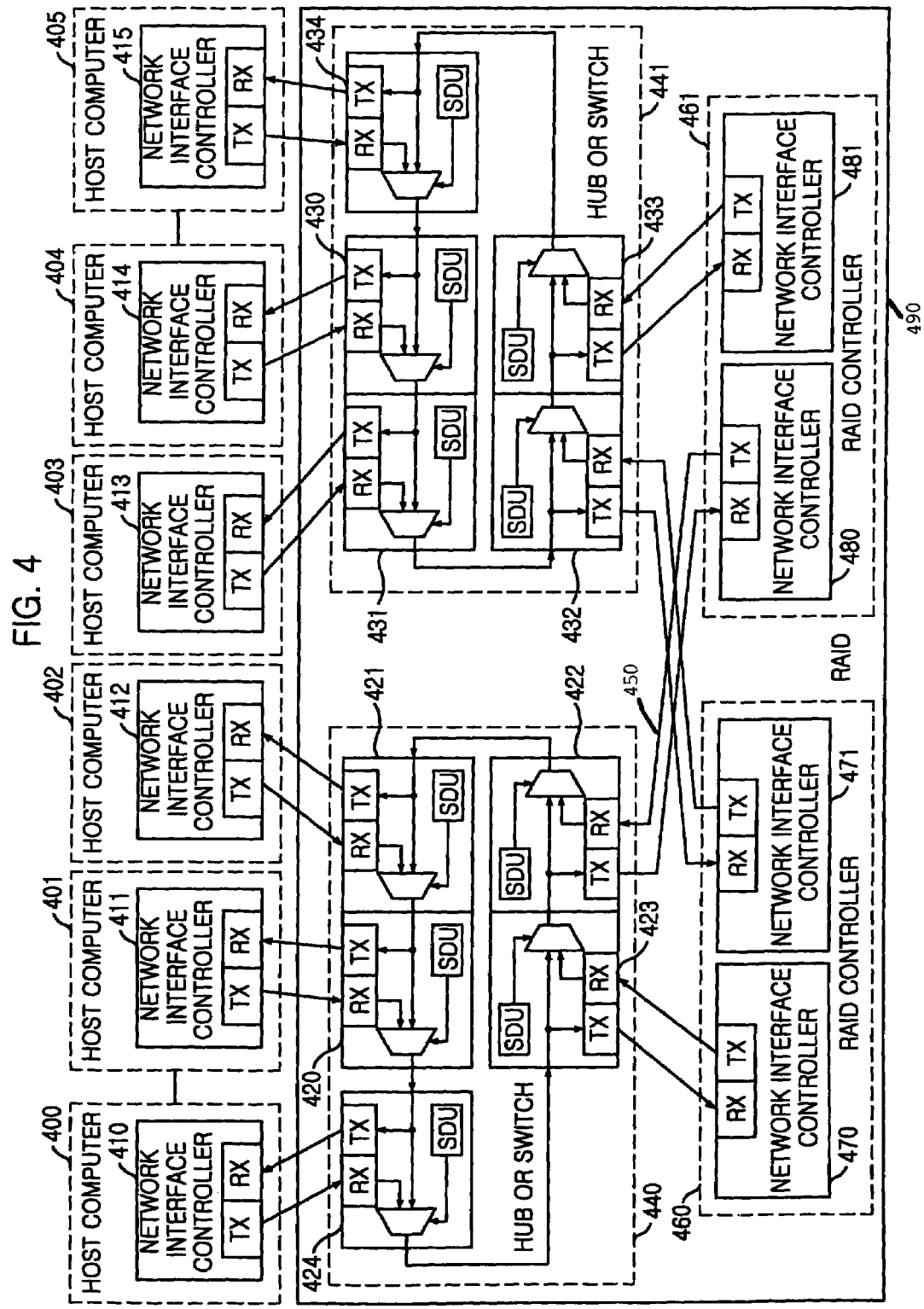
FIG. 4 is a block diagram showing one embodiment of a host interface system as an internal installment system between a RAID and host computers in accordance with the present invention.

FIG. 4 is a block diagram showing one embodiment of a host matching system as an internal installment system between a RAID and host computers in accordance with the present invention.

As shown in FIG. 4, in the inventive host interface system, a communication circuit is provided in order for an error recovery between two RAID controllers 460, 461, and the bandwidth between two groups as the host computers 400 to 405 and two RAID controllers 460, 461 becomes twice the single connection bandwidth. Also, in the inventive host interface system, even though one RAID controller 460 or 461 has an occurrence of a trouble, the bandwidth becomes twice the single connection bandwidth.

That is to say, in a RAID 490, two RAID controllers 460, 461 and hubs 440, 441 exist, and in each of the RAID controllers 460, 461, a pair of network interface controllers 470, 471; 480, 481 are provided. Herewith, the hubs 440, 441 are provided to connect a system connected to these hubs by one network and maintain the network even though one system has an occurrence of a trouble or a short of a line, and it can be as a hub or a switch. Hereinafter, they are named a "hub" altogether.

Hub ports, 420 to 424, 430 to 434, shown in FIG. 4 indicate an example for a simple internal structure of a fibre channel arbitrated loop hub, and this is based on an already well-known technique, thus there will be herein no more description therefore in the invention. The hub observes its corresponding communication network standard.

A network, in which the RAID controllers, the hubs and the host computers are connected with one another, corresponds to the industrial standard communication network such as fibre channel, asynchronous transfer mode (ATM) and InfiniBand etc. and they are hereinafter named a 'network'.

Network interface controllers, 410 to 415, contained into the host computers, 400 to 405, and the network interface controllers 470, 471, 480, 481 of the RAID controllers 460, 461 are connected with one another by two networks through two hubs 440, 441, and according to a sort of the networks, the network interface controller becomes a fibre channel controller, an ATM controller and an InfiniBand controller etc.

At this time, a communication line, representatively shown as 450 in the drawing, for connecting the network interface controller to the hub is a copper line or an optical fibre, which is matched to a corresponding standard.

Meanwhile, two network interface controllers 470, 471 of the first RAID controller 460 are respectively connected to two different hub ports 423, 432, and two network interface controllers 480, 481 of the second RAID controller 461 are respectively connected to two different hub ports 422, 433. The rest ports 420, 421, 424, 430, 431, 434 of the hubs 440, 441 are connected to the host computers 400 to 405. Just, there is no distinction between the hub ports 420 to 424 of the first hub 440 at all. Also, there is no distinction between the hub ports 430 to 434 of the second hub 441 at all.

The hub port connected to the host computer among the hub ports of the hub 440, namely, 420, 421, 424, is more than one, and there is no limitation to the maximum number. Further, What it is connected to the host computer among the hub ports of the second hub 441, namely, 430, 431, 434, is more than one, and there is no limitation to the maximum number. The hub ports 424, 434 and the host computers 400, 405, which are shown as dot lines in FIG. 4, mean that there is no, or more than one hub port or host computer.

Since, in such construction, two independent networks are constructed; it has twice the bandwidth of the single network, and a communication passage between two RAID controllers needed to perform the fault tolerant function of two RAID controllers 460, 461 is formed. Thus, information from the second network interface controller 471 of the first RAID controller 460 is sent to the first network interface controller 481 of the second RAID controller 461. Also, information from the second network interface controller 480 of the second RAID controller 461 is transmitted to the first network interface controller 470 of the first RAID controller 460. Further, information from the first network interface controller 481 of the second RAID controller 461 is transmitted to the second network interface controller 471 of the first RAID controller 460, and information from the first network interface controller 470 of the first RAID controller 460 is sent to the second network interface controller 480 of the second RAID controller 461.

The first network interface controllers 470, 480 of two RAID controllers 460, 461 respectively supply data of the host computers 400 to 402 connected to the first hub 440 and the host computer 403 to 405 connected to the second hub 441, and process information transmitted from the opposite network interface controllers 471, 481.

If any one out of two RAID controllers 460, 461 has an occurrence of an error, the RAID controller having the error occurrence is removed from the network, and a second network interface controller of an opposite RAID controller not having the error occurrence takes over a function of a first network interface controller of the RAID controller having the error occurrence.

Figure 5:
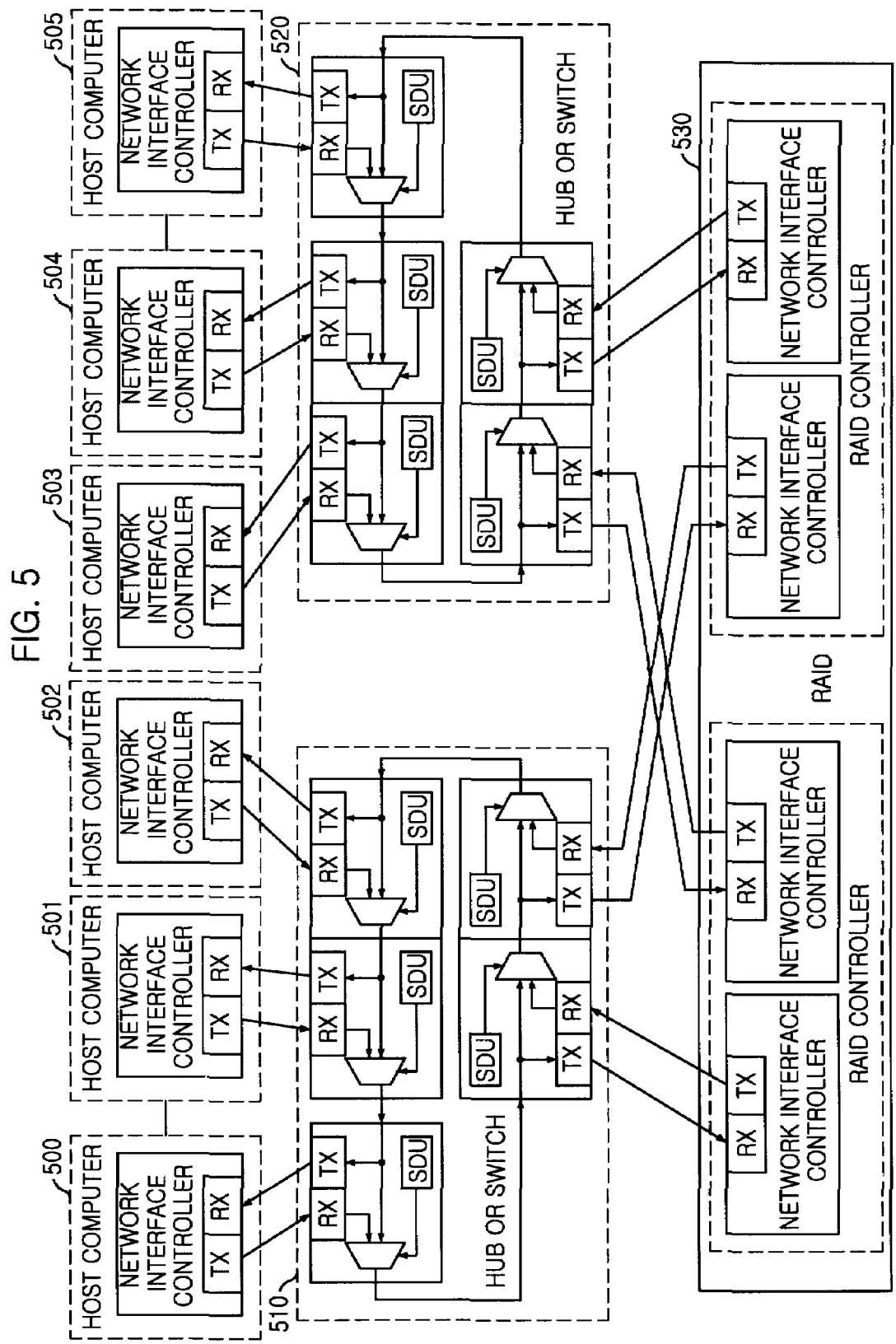
FIG. 5 depicts a block diagram providing one embodiment of a host interface system as an external installment system between a RAID and host computers in the present invention.

FIG. 5 is a block diagram providing one embodiment of the host interface system as an external installation system between the RAID and the host computers in the present invention.

As shown in FIG. 4, the present invention can be constructed by a method of internally installing the hubs 440, 441 in the RAID 490, and as shown in FIG. 5, the host computers 500, 501, 502, 503, 504 and 505 are connected to the RAID 530 by using external hubs 510 and 520.

Figure 6:
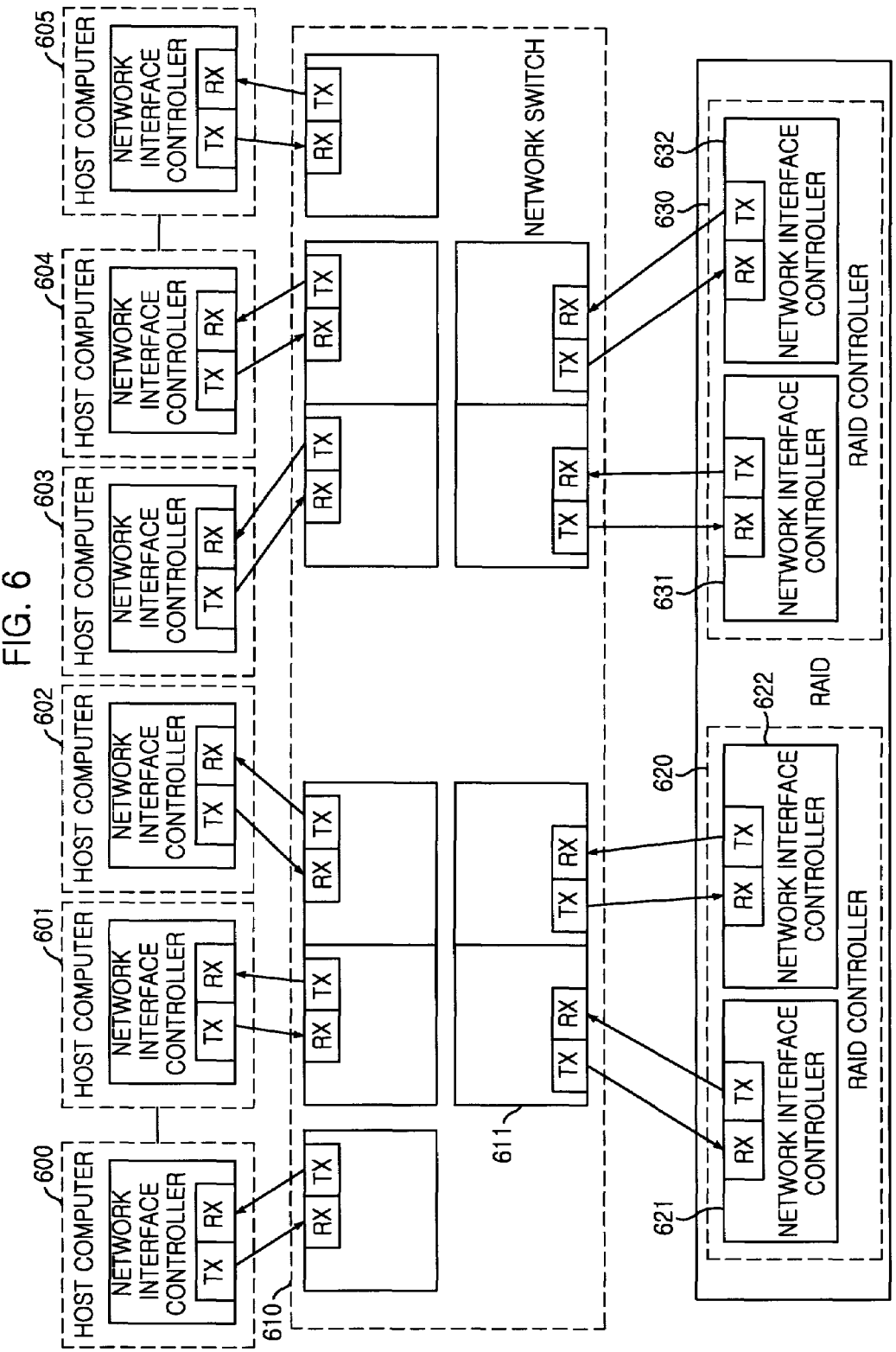
FIG. 6 is a block diagram showing one embodiment of a host interface system as a network switch between a RAID and host computers in the invention.

FIG. 6 is a block diagram showing one embodiment of the host interface system as a network switch between the inventive RAID and host computers.

As shown in the drawing, a plurality of host computers 600, 601, 602, 604 and 605 are connected to RAID through a network switch 610. In other words, information from a second network interface controller 622 of a first RAID controller 620 is sent to a first network interface controller 632 of a second RAID controller 630, and information from a second network interface controller 632 of the second RAID controller 630 is transmitted to a first network interface controller 621 of the first RAID controller 620. Further, information from the first network interface controller 631 of the second RAID controller 630 is transmitted to the second network interface controller 622 of the first RAID controller 620. Also, information from the first network interface controller 621 of the first RAID controller 620 is sent to the second network interface controller 632 of the second RAID controller 630.

Just, there is no distinction between respective ports, representatively 611, of a network switch 610 at all and also, the internal structure of a network switch 610 can be configured according to a selection of a user (not shown in FIG. 6).

In accordance with the present invention, as afore-mentioned, even in a case of an error occurrence in a RAID controller, there exist two independent networks and two network interface controllers, and the bandwidth of a single network can be twice maintained. Accordingly, a function of fault tolerance between two RAID controllers can be constructed without a drop of the bandwidth.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. An apparatus for a redundant interconnection between multiple hosts and a RAID, comprising:
  a first RAID controlling units and a second RAID controlling unit for processing a requirement of numerous host computers, the first RAID controlling unit including a first network controlling unit and a second network controlling unit, and the second RAID controlling unit including a third network controlling unit and a fourth network controlling unit; and
  a plurality of connection units for connecting the first RAID controlling units and the second RAID controlling unit to the numerous host computers, wherein the first RAID controlling unit and the second RAID controlling unit directly exchange information with the numerous host computers through the plurality of connecting units, and the first network controlling unit exchanges information with the fourth network controlling unit, and the second network controlling unit exchanges information with the third network controlling unit.

2. The apparatus as recited in claim 1, wherein said respective RAID controlling units are connected to the plurality of individual connecting units.

3. The apparatus as recited in claim 2, wherein the first network interface controlling unit is coupled to the connecting unit of one side and the second network interface controlling unit is coupled to the connecting unit of another side.

4. The apparatus as recited in claim 3, wherein
  the first network interface controlling unit and the third network interface controlling unit process the requirement of the numerous host computers; and
  the second network interface controlling unit and the fourth network controlling unit are used for communication between the first RAID controlling unit and the second RAID controlling unit when the first and second RAID controlling units are not faulty and the second network interface controlling unit and the fourth network controlling unit are used for executing a function of the first network interface controlling unit and the third network controlling unit when one of the first RAID controlling unit and the second RAID controlling unit is faulty.

5. The apparatus as recited in claim 1, wherein said plurality of connecting units have at least three connection ports, two of the at least three connection ports is coupled to one of the first network interface controlling unit and the third network controlling unit and the rest of the connection ports being provided as a hub equipment connected with the numerous host computers.

6. The apparatus as recited in claim 1, wherein said plurality of connecting units have at least three connection ports, two of the at least three connection port are coupled to one of the first network interface controlling unit and the third network controlling unit and the rest of the connection ports being provided as a network switch equipment connected with the numerous host computers.

7. The apparatus as recited in claim 1, wherein said plurality of connecting units have at least five connection ports, four of the at least five connection ports is coupled to one of the first network interface controlling unit and the third network controlling unit and the rest of the connection ports being provided as a switch connected with the numerous host computers.

8. The apparatus as recited in claim 1, wherein the first network interface controlling unit of the first RAID controlling unit being connected to a first connecting unit, the second network interface controlling unit of said first RAID controlling unit being connected to a second connecting unit, the third network interface controlling unit of the second RAID controlling unit being connected to the second connecting unit, and the fourth network interface controlling unit of the second RAID controlling unit being connected to the first connecting unit.

9. An apparatus for a redundant interconnection between multiple host computers and a RAID, the apparatus comprising:
  a plurality of connection units for connecting the host computers and the RAID;
  a first and a second RAID controllers, included in the RAID, each of which having a first network interface controller and a second network interface controller for processing requests from the plurality of the host computers connected through the plurality of the connection units,
  wherein the first network interface controller in the first RAID controller supplies data to the host computers connected through the plurality of connection units and processes information transmitted from the second network interface controller in the second RAID controller,
  wherein the first network interface controller in the second RAID controller supplies data to the host computers connected through the plurality of connection units and processes information transmitted from the second network interface controller in the first RAID controller,
  wherein the second network interface controller in the first RAID controller is used for fault tolerance by performing functions of the first network interface controller in the second RAID controller when the second RAID controller is faulty, and
  wherein the second network interface controller in the second RAID controller is used for fault tolerance by performing functions of the first network interface controller in the first RAID controller when the first RAID controller is faulty, and
  wherein the first network controlling unit in the first RAID controlling unit exchanges information with the second network controlling unit in the second RAID controlling unit, and the second network controlling unit in the first RAID controlling unit exchanges information with the first network controlling unit in the second RAID controlling unit.

* * * * *